May 19, 1953  K. C. BUGG  2,638,943
COIL WINDING DEVICE
Filed March 11, 1949  4 Sheets-Sheet 1
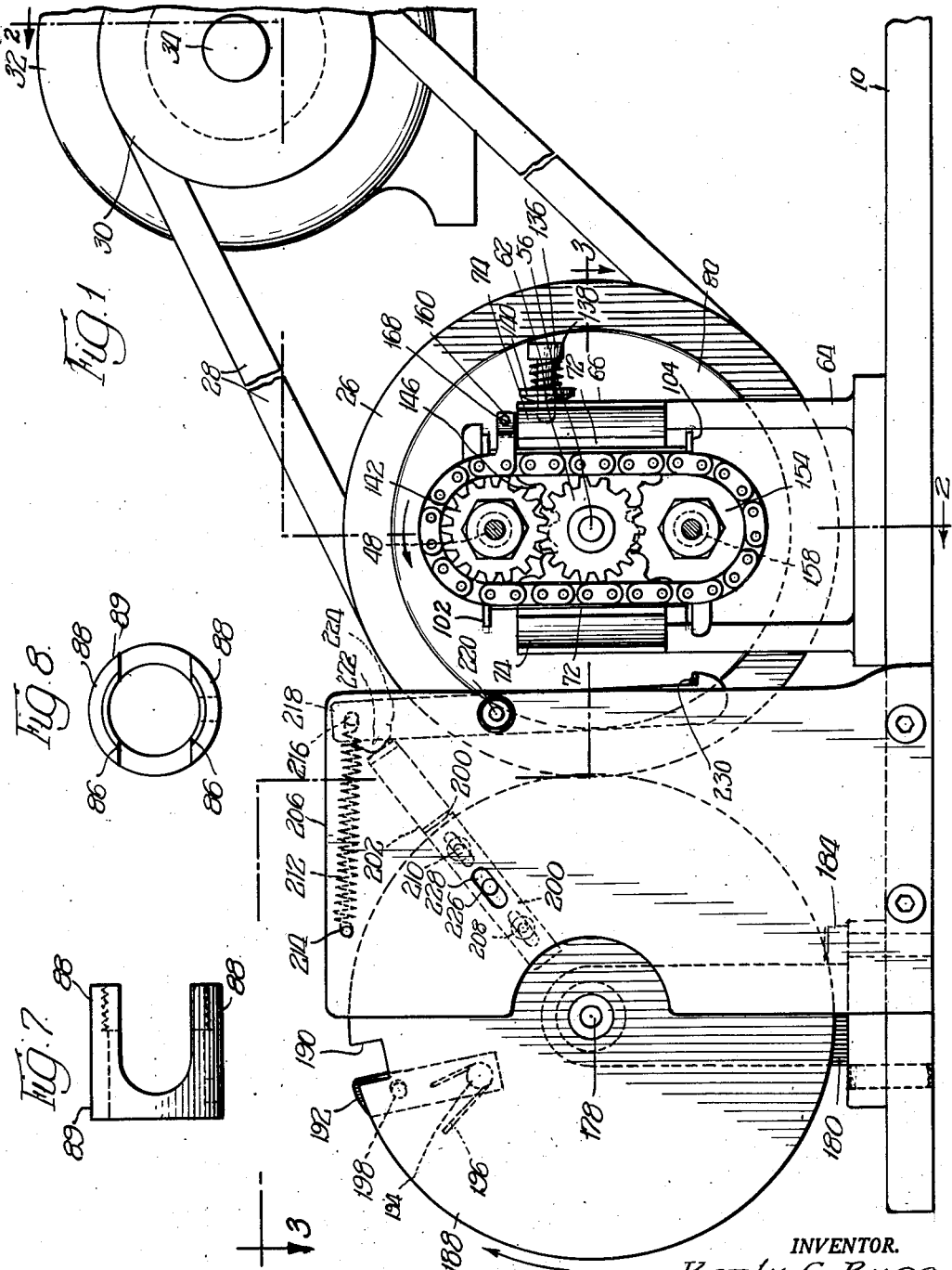
INVENTOR.
Kenly C. Bugg.

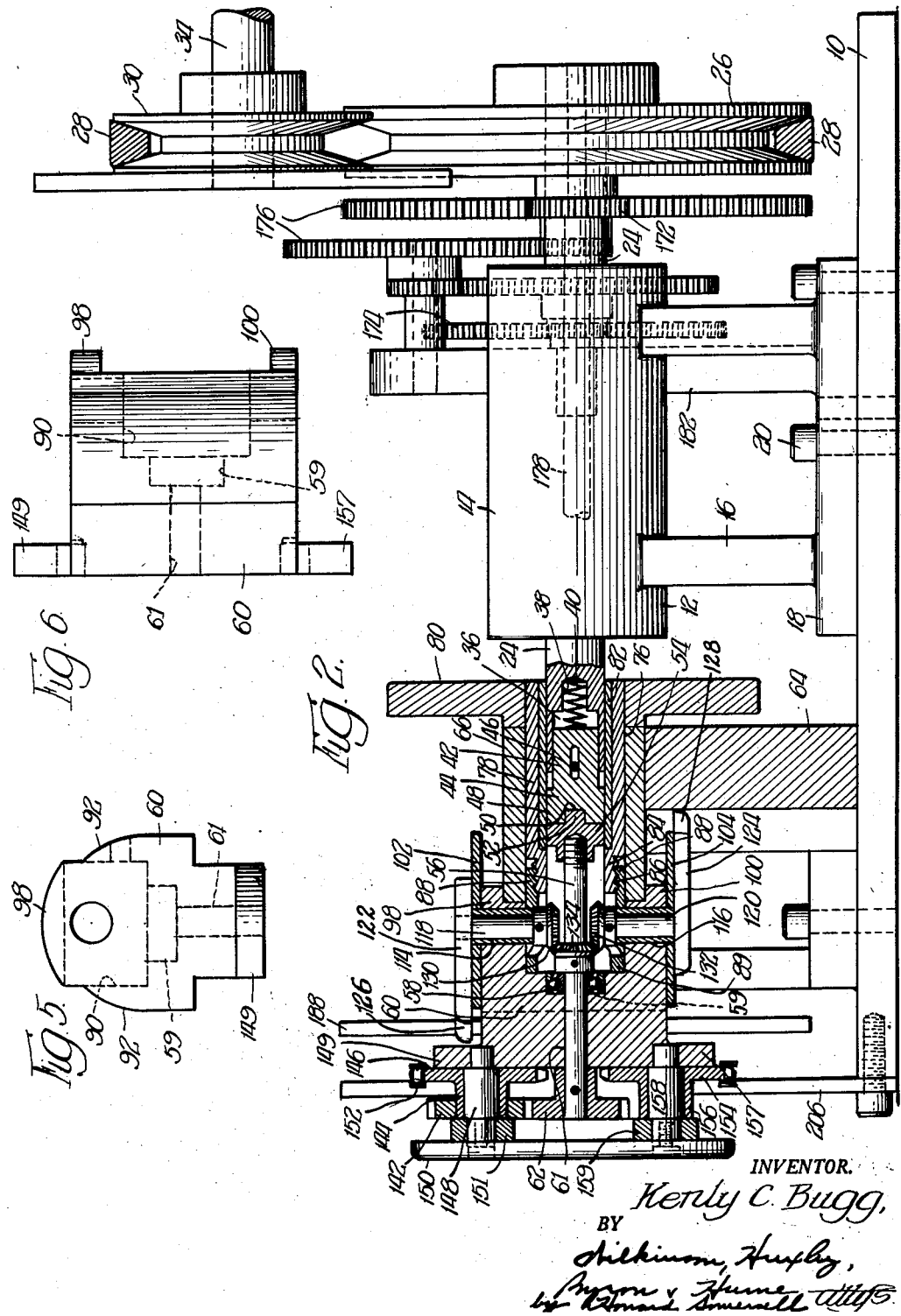

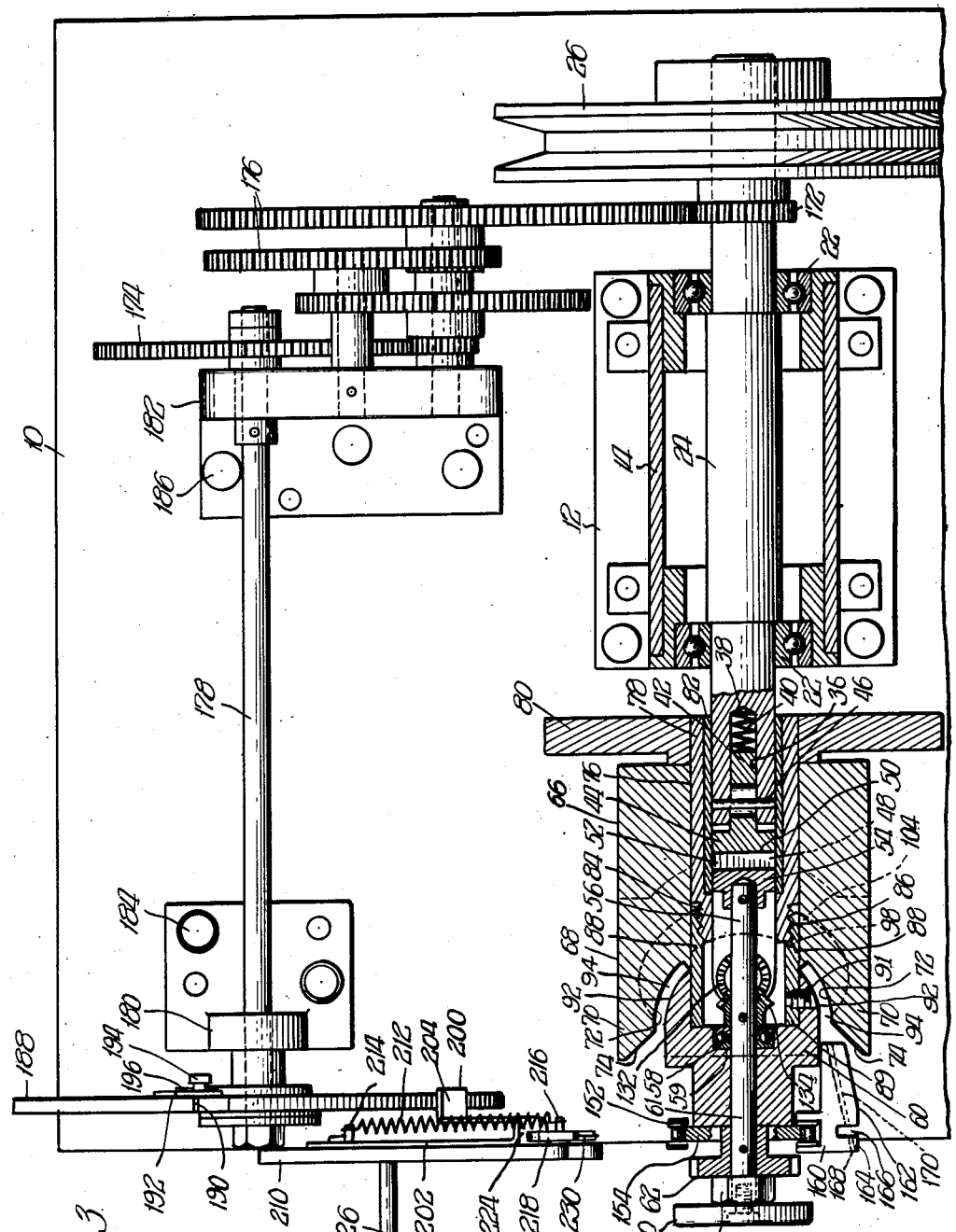

May 19, 1953  K. C. BUGG  2,638,943
COIL WINDING DEVICE
Filed March 11, 1949  4 Sheets-Sheet 4
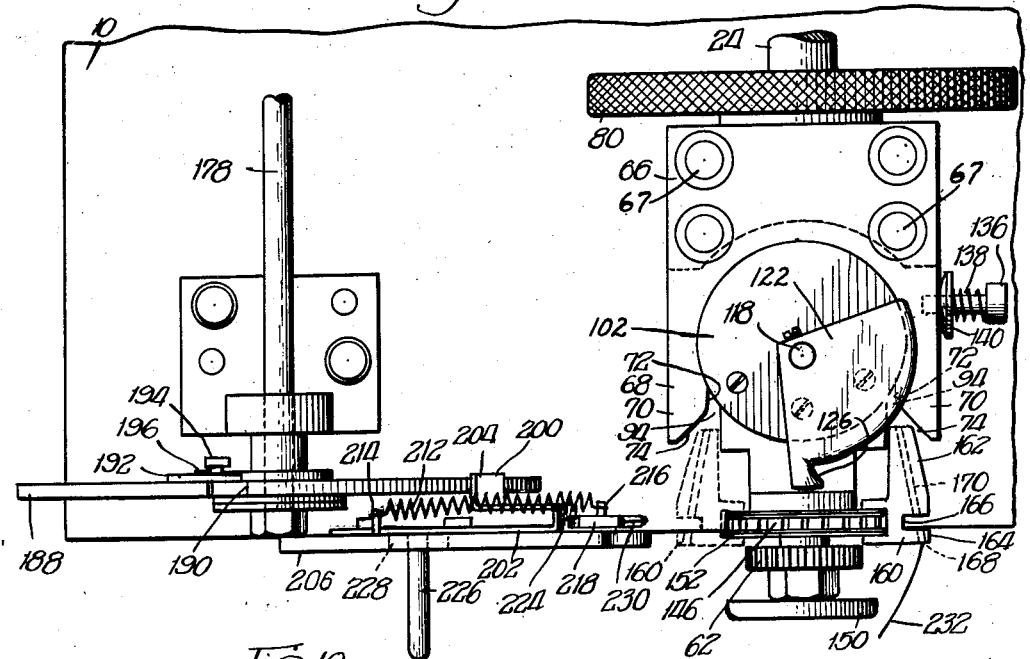
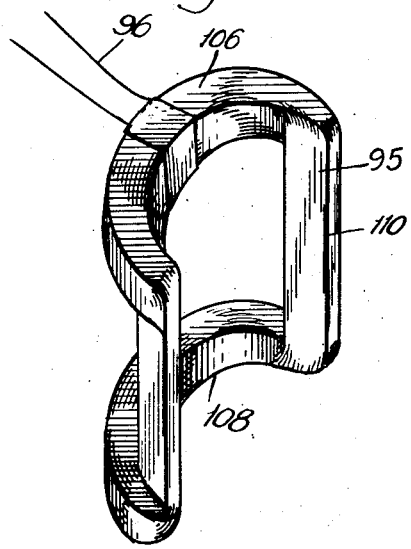
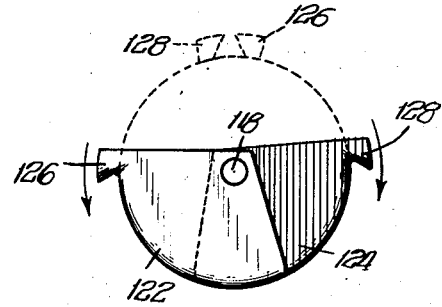
INVENTOR.
Kerly C. Bugg,
BY Patented May 19, 1953

2,638,943

UNITED STATES PATENT OFFICE 2,638,943

COIL WINDING DEVICE

Kenly C. Bugg, Fort Wayne, Ind., assignor, by mesne assignments, to Kendick Manufacturing Company, Inc., Fort Wayne, Ind., a corporation of Indiana, nominee Application March 11, 1949, Serial No. 80,904

9 Claims. (Cl. 140—92.1)

This invention pertains to a winding machine for winding wire into coils of any selected shape in a continuous winding operation which shapes the coils into final shape as they are being wound.

There are various devices utilizing coils (of wire) of various shapes, and it is usual, particularly for coils of irregular shape, to wind said coils from the wire into a preliminary, readily formed, shape and after the preliminarily shaped windings are complete, they are thereafter shaped by one or more steps into their final desired shape. Coils of odd or irregular shape are found in some types of motor windings, in the radio and television fields, such as for various tubes, and for other uses.

Difficulty has been experienced in providing a machine for winding a continuous strand of wire into a coil wherein there is a uniformity of winding, and this is particularly encountered where the wire is first wound in a coil of one form and thereafter reshaped. The reshaping or bending necessary has been found to displace the adjacent strands of the wire so that they are apt to cross one another, or where severe bending must be used, as where parts of the winding are bent through large angles, stresses are set up which either weaken or destroy the wire, or break down the insulation thereof, or destroy the coating thereon, causing a defective winding which is either inoperative, or must be replaced after little use. Further, difficulty has been encountered in providing a machine for winding even the most simple coils at a high rate of speed.

It is, therefore, an object of this invention to provide a machine for winding coils of substantially any selected shape, so that coils are wound by the machine in the final shape desired.

Another object of the invention is to provide a machine for winding coils from a continuous wire, wherein the wires making up parts of the winding, or the wires forming the striations of the winding, are kept in uniform and proper relative position one with respect to the other.

Another object of the invention is to provide a machine for winding coils from wire wherein the coils produced by the machine can always be made of identical size and shape.

Another object of the invention is to provide a machine which is adapted to wind wire coils at extremely high speeds, whereby the coils may be manufactured economically, but wherein the uniformity of the windings is not sacrificed.

Another object of the invention is to provide a machine for winding coils, wherein the coils can be manufactured without setting up damaging stresses in the wire forming the coils, the machine being particularly adapted to wind coils wherein bends or turns are incorporated, the machine being adapted to place or wind the wire at said turns so that there is no damage to the covering of the wire, nor it there any undue stretching or stressing of the wire.

Another object of the invention is to provide a machine for winding coils which is adapted to complete the required turns necessary to complete the coil, and when the predetermined number of turns are wound, the coil is automatically severed from the wire remaining in the storage or spool from which the coil wire was taken.

Another object of the invention is to provide a coil winding device which is inexpensive to make and maintain, but is of rugged construction.

Another object of the invention is to provide a machine for winding coils wherein the winding operation is effected by a continuous feeding motion of the wire going into the winding, such as where the wire is fed in a circular rather than a reciprocatory manner.

Another object of the invention is to provide a coil winding machine wherein the coils can be quickly wound and readily removed from the machine so that a new winding operation can be quickly started, thereby maintaining the non-productive turn of the machine at a minimum.

With these and various other objects in view, the invention consists of certain novel features of construction and operation as will be more fully described and particularly pointed out in the specification, drawings and claims appended hereto.

In the drawings which illustrate embodiments of the device and wherein like reference characters are used to designate like parts—

Figure 1 is a fragmentary end elevation of a coil winding device embodying the invention;

Figure 2 is a partly sectional and elevational view through a portion of the coil winding device illustrated in Figure 1, the sectional part being taken substantially in the plane as indicated by the line 2—2 of Figure 1;

Figure 3 is a partly sectional and plan view of the coil winding device illustrated in Figures 1 and 2, the sectional part being taken substantially in the plane as indicated by the line 3—3 of Figure 1;

Figure 4 is a fragmentary top plan view of a portion of the coil winding device illustrated in Figures 1 to 3, inclusive, to wit, the winding head and timing cutter;

Figure 5 is a plan view of the winding head block of the coil winding device illustrated in Figures 1 to 4, inclusive;

Figure 6 is a side elevation of the block illustrated in Figure 5;

Figure 7 is a side elevation of the holding finger member used with the winding head block shown in Figures 5 and 6;

Figure 8 is an end elevation of the member illustrated in Figure 7, looking toward the left as viewed in Figure 7;

Figure 9 is a top plan view of the movable wire guiding fingers of the winding head of the coil winding device, the full line position showing the relative position of the fingers when the device is in one cycle of operation, the dotted line position showing said fingers in another cycle of operation, each arrow indicating the direction of rotation of the adjacent finger; and Figure 10 is a perspective elevation of a form of coil wound by the device illustrated in Figures 1 to 9, inclusive.

In the device illustrated in Figures 1 to 9, inclusive, the base 10 is provided with the pillar block assembly 12 (Figures 2 and 3) comprising the journal 14 secured by brackets 16 to the base 18, which in turn is secured to the base 10, journal 14 being provided with spaced antifriction bearings 22 (Figure 3) in which shaft 24 is journalled. Shaft 24 is provided with the operating pulley 26 for accommodating the belt 28, said belt being driven through the pulley 30 by a prime mover such as the motor 32. A suitable clutch (not shown) is preferably interposed between motor shaft 34 and the pulley 30.

Shaft 24 is provided with the socket 36 (Figures 2 and 3) communicating with the spring socket 38 in which spring 40 is disposed, spring 40 bearing against the inner end of tang mating member stem 42 of tang mating member 44, urging said member outwardly of the shaft 24, a pin and slot connection 46 being provided between shaft 24 and stem 42 to limit the outward movement of member 44. Tang mating member 44 is provided with the head 48 having the slot 50 for receiving tang 52, tang 52 being provided on the tang head 54 secured at one end to shaft 56. Shaft 56 is journalled in antifriction bearings 58 provided in recess 59 (Figures 2, 3, 5 and 6) of the winding head block or housing 60, and extends through passage 61 of said block and is provided at its outer end with pinion 62 (Figures 1, 2 and 3).

Base 10 is provided with pedestal 64 (Figures 1 and 2) to which the forming die block 66 is secured by bolts 67 (Figure 4), said block being provided at its outer end with the forming die 68 (Figures 3 and 4) which in the form shown, is illustrated as comprising spaced facing fingers 70 having inner arcuate surfaces 72 communicating with the outer diverging guide surfaces 74.

The block 66 is provided with the cylindrical passage 76 (Figures 2 and 3) the axis of which is aligned with the axis of shaft 24, and sleeve 78 is journalled in passage 76, sleeve 78 being adapted to be rotated by means of knurled wheel 80. Sleeve 78 is provided with the journal 82 in which the forward end of shaft 24 is journalled, the forward end of sleeve 78 being thread as at 84 for engagement with complementary threads 86 provided on spaced holding fingers 88. Fingers 88 are disposed on member 89 (Figures 2, 3, 7 and 8), generally cylindrical in shape, and received in recess 90 of block 60, being secured thereto as by stud 91, the free ends of said fingers slidably fitting within the passage 76 of block 66. Winding head block 60 is provided with the spaced, vertically extending, arcuate forming die portions 92 (Figures 3 and 5) complementary to the adjacent surfaces 72, being adapted to be spaced therefrom a predetermined distance, when block 60 is in assembled position on block 66, to form recesses or slots 95 for the reception of the windings of the coil 94 (Figure 10) formed by the wire 96.

The winding head block 60 is provided with the spaced, upper and lower, arcuate flanges 98 and 100 (Figures 2, 3, 5 and 6) adapted to engage top and bottom surfaces of the block 66. Winding block 60 is provided with the spaced upper and lower forming shrouds or circular plates 102 and 104 which, when the block 60 is in assembled position with respect to the block 66, as illustrated in Figure 2, is in spaced relation to the top and bottom surfaces of the die block 66 in order to provide forming dies to accommodate the top and bottom arcuately formed legs 106 and 108 of the coil 95. Legs 106 and 108 are formed of wire windings connected by the vertical legs 110 of said wire windings which lie along the side of block 66 within the slots 94 formed between the arcuate surfaces 72 and 92, arcuate legs 106 and 108 being formed as the coil is being made by the arcuate flanges 98 and 100.

Block 60 and plates 102 and 104 have bearing sleeves 114 and 116 extending therethrough and fixed therein, and shafts 118 and 120 extend through said sleeves, being provided at their outer ends with top and bottom wire guiding members 122 and 124 (Figures 2, 4 and 9), said members being provided with the substantially hook-shaped bevelled wire guide fingers 126 and 128 bevelled toward the respective adjacent plates 102 and 104. Members 122 and 124 are disposed to rotate in opposite directions as illustrated by the arrows shown in Figure 9, that is, in the direction in which each hook point faces, shafts 118 and 120 being provided with the bevel gears 130 and 132 which are adapted to mesh with and be driven by bevel gear 134 fixedly secured to shaft 56, said bevel gears being shown as of the same diameter whereby shafts 118 and 120 rotate at the same speed as shaft 56. Block 66 is provided with the headed pin 136 (Figures 1 and 4) secured at one side of the block, the head of said pin forming a spring seat for one end of spring 138, the opposite end of said spring urging the movable washer 140 toward block 66 whereby a readily releasable fastening means is provided for one end of the wire 96 to be wrapped in the form of the coil illustrated in Figure 10.

Pinion 62 meshes with pinion 142 (Figures 1 and 2) of the same diameter, fixedly mounted on the hub 144 of sprocket 146, the hub of said sprocket being rotatably mounted on shaft 148 secured at one end in the top flange 149 of block 60 and at the other end to the handle plate 150, a suitable positioning collar 151 being interposed between hub 144 and plate 150. Chain 152 passes around sprocket 146 and around sprocket 154, sprocket 154 being of the same diameter as sprocket 152 and having a hub 156 (Figure 2) rotatably mounted on the shaft 158, disposed in parallel relation with the shaft 148, and having its opposite ends secured to bottom flange 157 of block 60 and to plate 150, a suitable positioning collar 159 being interposed between hub 156 and plate 150.

Chain 152 is provided with the wire wrapping guide or needle 160 secured to said chain to travel therewith. Needle 160 is provided with the body portion 162 (Figures 3 and 4) and the spaced flange 164 providing a cutting slot 166. Flange 164 and body 162 are provided with aligned passages 168 and 170, respectively, passages 168 and 170 being preferably flared at the opposite ends of the needle and extending toward the adjacent slot 112 moving between the entrance to said slot provided between die portions 92 and the flared portions 74 of block 66. The inner end of the needle 160, that is, the discharge end of passage 170 is so disposed that it travels in vertical lines closely adjacent to the paths described by the notches formed by the junction between fingers 126 and 128 and their respective members 122 and 124. Passages 168 and 170 of needle 160 are so disposed that when at least the discharge end of passage 170 is substantially in a horizontal plane through the axis of shaft 148, the notch of finger 126 is in a vertical plane passing through the axes of shafts 148 and 158, and the gearing (130, 132, 134, 62 and 142) of the winding head is such that the members 122 and 124 rotate in a ratio of 1 to 2 with respect to the rotation of sprockets 146 and 154.

Shaft 24 is provided with gear 172 (Figures 2 and 3) adapted to drive gear 174 through a gear train indicated generally at 176, gear train 176 being variable and selected to give the required rotation to shaft 178. Shaft 178 is journalled in brackets 180 and 182, secured as at 184 and 186 to the base 10 and are disposed to locate the shaft 178 in parallel relation and adjacent to shaft 24. Shaft 178 is provided with the cutter blade timing plate 188 notched as at 190 and provided with a notch control finger 192 disposed on the trailing edge of notch 190, plate 188 rotating in the direction of the arrow illustrated in Figure 1. Plate 188 is rotatably, but frictionally, mounted on shaft 178 and finger 192 projects slightly beyond the periphery of plate 188 and is pivoted thereto as at 194, being provided with the spring 196 urging the finger slightly into notch 190, the distance that the blade 192 can project into the notch being regulated by the pin and slot connection 198 between finger 192 and plate 188.

Detent 200 (Figures 1 and 4) is provided on the slide bar 202, detent 200 being provided with the flange 204 extending across the periphery of plate 188 and adapted to be received in notch 190. Supporting bracket 206 is secured to base 10, and slide bar 202 is slidably mounted on said bracket through pin and slot connections 208 and 210, the axis of slide bar 202 being disposed to intersect the axis of shaft 178. Bar 202 is urged toward shaft 178 by means of spring 212 secured at one end as at 214 to bracket 206 and at its other end as at 216 to one end of cutter lever 218. Cutter lever 218 is pivoted as at 220 to bracket 206, and the upper end of said lever is provided with the projection 222 engaging the outer end 224 of slide 202. Slide 202 is thus urged toward shaft 178 by spring 212, being limited in its extreme movements of translation through the pin and slot connections 208 and 210.

In order to move the slide bar 202 in a direction away from shaft 178, a pin 226 is provided on said slide bar extending through the slot 228 provided in bracket 206 and extending in the direction of the axis of bar 202. The lower end of cutter lever 218 is provided with the cutter blade 230 urged by the spring 212 in a direction to enter the cutting slot 166 of the needle 160.

While only one notch 190, and finger 192 is illustrated, of course, it is to be understood that any number may be used, depending upon the timing desired. For the purpose of this application it will be sufficient that only one notch 190 and associated fingers 192 be illustrated, the timing of the shaft 178 and, consequently of the plate 188, being controlled by the selection of gearing 176.

While dies and blocks are illustrated for winding the coil as illustrated in Figure 10, that is, a coil wherein vertical legs 110 are formed connected by arcuate connecting legs 106 and 108 (formed at the time of winding), it will, of course, be understood that dies for shaping the winding in any desired shape may be used.

The coil illustrated in Figure 10 is adapted particularly to be used as a cathode ray tube deflection coil and must be wound extremely accurately, and the adjacent wire strands, forming the composite legs of the coil, must be held to perfect over-all dimension, and there must not be any interlacing or crossing of the adjacent wires, nor must there be any damage to the wire as by cutting or stretching where the turns, in this case 90°, are made.

Assuming that is is desired to wind a coil, which by way of illustration may be as illustrated in Figure 10, the winding device is assembled as shown in Figures 1 to 4, inclusive, the needle 160 being disposed substantially as shown in Figure 1, wherein the outlet of passage 168 is in a horizontal plane through the axis of shaft 148, and the notches of fingers 126 and 128 are in a vertical plane through shafts 148 and 158, guide fingers 126 and 128 extending toward the handle 150. The wire 232 to be used for winding, is led from the storage device, through a tensioning device, preferably as illustrated in Applicant's application Serial No. 87,072, filed April 12, 1949, now Patent No. 2,552,086, passing through a guide eye (not shown) between the tensioning device and needle 160, which guide eye is preferably in alignment with the axis of shaft 56. The wire from the guide eye passes through passages 168 and 170 and is passed downwardly through the outer slot 112 (the one at the right of Figure 4) and is passed out of the bottom of said slot around the lower surface of block 66, and the end of the wire is secured by winding it around the pin 136 between block 66 and washer 140.

Assuming that the winding device had been previously operated and arrested, flange 204 of detent 200 will be in notch 190. Pin 226 is moved outwardly from shaft 178, raising the flange 204 out of notch 190 permitting finger 192 to move slightly inwardly of the notch 190 to prevent flange 204 from re-entering notch 190, finger 192 supporting flange 204 slightly off of the periphery of plate 188. Rotation of the motor shaft 34 will cause rotation of the pulley 30, assuming the clutch to be operative, causing the belt 28 to rotate pulley 26, rotating shafts 24 and 178 in their proper, selected timed relation. Rotation of shaft 24 rotates shaft 56, which in turn rotates gears 134, 130 and 132 and shafts 118 and 120. Rotation of shafts 118 and 120 rotates wire guiding members 122 and 124. Rotation of shaft 56 also rotates pinions 62 and 142, thereby rotating sprocket 146 to move chain 152 around sprockets 146 and 154 to thereby move the needle 160 in the direction as illustrated in Figure 1.

Finger 160 will rotate over the plane of finger 126 and member 122 slightly in advance of the notch of finger 126, causing finger 126 to pick up or engage the wire and move it rearwardly, that is, in a direction so that it will pass over or beyond the inner periphery of the forming plate 102. From the time the notch of finger 126 reaches its rearmost position as shown in the dotted lines in Figure 9, that is, in the closest position to the wheel 86, and as it moves from said position a predetermined amount of slack occurs in the wire. At the time the notch of finger 126 is in rearmost position as just described, the needle 160 will be in its topmost position.

Continued rotation will cause the needle 160 to precede the finger 126, passing below said finger as it reaches its position in a horizontal plane to the left of the vertical plane passing through shafts 148 and 158 (as viewed in Figure 1). Thus the wire will be moved downwardly into the upper slot 94 (as viewed in Figure 3), but still in a predetermined loose condition. Member 124 provided with finger 128 is timed in a similar manner with respect to that of needle 160 as is member 122 (but rotates in an opposite direction), thus needle 160 will precede the notch of finger 128 passing below the plane of guiding member 124, after which the notch of finger 128 will pick up the wire, and from that point to a point where the finger is at its lowermost position, the slack previously referred to will be taken up, causing the wire to form in the shape of top flange 106 (Figure 10) around the arcuate surface of forming flange 98.

As finger 160 passes from its lowermost position toward the upper slot 94 (Figure 3), the notch of finger 128 will be moving toward its innermost position as illustrated in Figure 9, and slack will again occur until such time as the wire is picked up by the notch of finger 126 after the needle has passed above the plane of guide member 122, at which time the second named slack will be taken up, causing the wire to be formed properly around the arcuate die surface of the lower flange 100.

Continued operation of the device will cause the formation of the coil, laying the striations of the wire in their proper parallel sequence and until the proper, selected coil size is reached. At this time timing plate 188 will have rotated through 360°, at which time the flange 204 of detent 200 will have ridden around on the periphery of plate 188 entering notch 190, moving the finger 192 out of said notch against the action of spring 196. Any over-travel of shaft 178 will be permitted without danger to the wire as the plate 188 will merely slip on shaft 178.

Movement of the detent into notch 190 will permit spring 212 to move the cutting lever 218 in a counterclockwise position as viewed in Figure 1, thereby causing the cutter blade 230 to move into cutting slot 166 of the needle 160, cutting the wire 232 giving a proper free end to the coil, the other free end being determined by the wire from the lower end of slot 94 to fastening means 140.

The coil so formed can then be removed from the die by rotating wheel 80 to cause disengagement between the threads 84 and 86, permitting the head block 60 to be removed. The coil (Figure 10) removed can then be processed in final condition and the head block 60 can be replaced readily for another operation by replacing it in the position shown in Figure 3 rotating wheel 80 to engage threads 84 and 86, it being noted that after the machine forms the coil it is not necessary to thereafter reshape the coil in any manner. If desired, the timing wheel 188 may operate a switch to deenergize motor 32 when flange 204 falls into notch 190, or may declutch said motor from shaft 34 rendering the winding device inoperative.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a coil winding machine, the combination of a base member, a drive shaft rotatably supported on said base member, a forming die block supported on said base member and having a cylindrical passage therethrough, a cylindrical sleeve journalled in said passage and having one end provided with a member disposed adjacent one end of said die block for rotating said sleeve, the other end of said sleeve being disposed in said passage and being threaded, said sleeve having a passage therethrough, said drive shaft having an end extending into said last named passage and being journalled in said sleeve, said last named end of said shaft being provided with a tang mating member resiliently mounted in said shaft but rotatable thereby, the die block having top and bottom, substantially horizontal, parallel die surfaces, the other end of said die block having substantially arcuate, diverging forming die fingers, a winding head adapted to be secured to said die block, said winding head comprising a head block provided with threaded means secured thereto and adapted to be releasably engaged by the threaded end of said sleeve to releasably secure said head block to said die block, said head block having a rotatable driven shaft journalled therein provided at its inner end with a tang engageable with said tang mating member whereby rotation of said drive shaft rotates said driven shaft, said head block having top and bottom spaced arcuate flanges engaging the top and bottom die surfaces respectively, and a forming plate provided on said head block projecting from each arcuate flange and spaced from said surfaces forming horizontal top and bottom die recesses, said head block having vertically extending arcuate surfaces spaced from said arcuate die fingers forming vertical die recesses on each side of said head block communicating with said top and bottom die recesses, vertically disposed top and bottom jack shafts journalled in said head block and rotated by said driven shaft, said jack shafts being provided, respectively, with top and bottom wire winding guiding members fixed to said shafts and rotatable on said forming plates, said jack shafts rotating in opposite directions, said guiding members each having a guiding finger projecting beyond said forming plates, spaced sprockets pivoted to shafts secured to said head block, the axes of said shafts being in a vertical plane through the axis of said driven, drive and jack shafts, means between said driven shaft and one of said sprockets for rotating said last named sprocket, a chain passing over said sprockets to be moved upon rotation thereof, said chain having a needle for leading wire to said recesses, said needle having a cutting recess through which the wire runs in passing through said needle, and means on said head block for securing the free end of the wire to be wound into a coil, rotation of said driven shaft causing the needle to lead the wire past one of said fingers, thereafter causing said last named finger to engage said wire, continued movement of the needle and last named finger causing movement of the wire into one of the horizontal recesses, and therefrom into one of the vertical recesses past the other finger, said last named finger and needle passing the wire through the other horizontal recess to the other vertical recess, and thence upwardly to again lead the wire to a position to be engaged by the first named finger, whereupon the cycle may be repeated a predetermined number of times to wind the coil to the shape of the adjacent parts forming said recesses.

2. In a coil winding machine, the combination of a rotatable drive shaft, a forming die block having a cylindrical passage therethrough, a cylindrical sleeve journalled in said passage and having one end provided with a member disposed adjacent one end of said die block for rotating said sleeve, the other end of said sleeve being disposed in said passage and provided with securing means, said sleeve having a passage therethrough, said drive shaft having an end extending into said last named passage and being journalled in said sleeve, said last named end of said shaft being provided with coupling means, the die block having top and bottom die surfaces, the other end of said die block having forming die means, a winding head adapted to be secured to said die block, said winding head comprising a head block provided with securing means for connection to said first named securing means to releasably secure said head block to said die block, said head block having a rotatable driven shaft journalled therein provided at its inner end with coupling means engageable with said first named coupling means whereby rotation of said drive shaft rotates said driven shaft, said head block having top and bottom spaced formed flanges engaging the top and bottom die surfaces, respectively, and a forming plate provided on said head block projecting from each flange and spaced from said surfaces forming horizontal top and bottom die recesses, said head block having vertically extending surfaces spaced from said forming die means forming vertical die recesses on each side of said head block communicating with said top and bottom die recesses, vertically disposed top and bottom jack shafts journalled in said head block and rotated by said driven shaft, said jack shafts being provided, respectively, with top and bottom wire winding guiding members fixed to said shafts and rotatable on said forming plates, said jack shafts rotating in opposite directions, said guiding members each having a guiding finger projecting beyond said forming plates, spaced sprockets pivoted to shafts secured to said head block, the axes of said shafts being in a vertical plane through the axis of said driven, drive and jack shafts, means between said driven shaft and one of said sprockets for rotating said last named sprocket, a chain passing over said sprockets to be moved upon rotation thereof, said chain having a needle for leading wire to said recesses, and means on said head block for securing the free end of the wire to be wound into a coil; rotation of said driven shaft causing the needle to lead the wire past one of said fingers, thereafter causing said last named finger to engage said wire, continued movement of the needle and last named finger causing movement of the wire into one of the horizontal recesses, and therefrom into one of the vertical recesses past the other finger, said last named finger and needle passing the wire through the other horizontal recess to the other vertical recess, and thence upwardly to again lead the wire to a position to be engaged by the first named finger, whereupon the cycle may be repeated a predetermined number of times to wind the coil to the shape of the adjacent parts forming said recesses.

3. In a coil winding machine, the combination of a rotatable drive shaft, a forming die block having a cylindrical passage therethrough, a cylindrical sleeve journalled in said passage and having one end provided with a member disposed adjacent one end of said die block for rotating said sleeve, the other end of said sleeve being disposed in said passage and being provided with securing means, said sleeve having a passage therethrough, said drive shaft having an end extending into said last named passage and being journalled in said sleeve, said last named end of said shaft being provided with coupling means, the die block having top and bottom die surfaces, the other end of said die block having spaced, vertically extending forming die means, a winding head adapted to be secured to said die block, said winding head comprising a head block provided with securing means for connection to said first named securing means to releasably secure said head block to said die block, said head block having a rotatable driven shaft journalled therein provided at its inner end with coupling means driven by said first named coupling means whereby rotation of said drive shaft rotates said driven shaft, said head block having top and bottom spaced die members forming die portions with the top and bottom die surfaces, respectively, said die portions communicating with said forming die means forming a die path therewith, top and bottom wire winding guiding members rotatably mounted on said head block and rotating in opposite directions, said guiding members being driven by said driven shaft and each having a guiding finger for receiving the wire for forming the coil, spaced sprockets pivoted to said head block, the axes of said sprockets being in a vertical plane through the axis of said driven and drive shafts, means between said driven shaft and one of said sprockets for rotating said last named sprocket, a chain passing over said sprockets to be moved upon rotation thereof, said chain having a needle for leading the wire to said die path, and means on said head block for securing the free end of the wire to be wound into a coil, rotation of said driven shaft causing the needle to lead the wire past one of said fingers, thereafter causing said last named finger to engage said wire, continued movement of the needle and last named finger causing movement of the wire into a portion of the die path, and therefrom into another portion of the die path past the other finger, said last named finger and needle continuing to pass the wire into the die path and thence to again lead to the first named finger, whereupon the cycle may be repeated a predetermined number of times to wind the coil to the shape of the die path.

4. In a coil winding machine, the combination of a rotatable drive shaft, a forming die block, said drive shaft being journalled in said block one end of said shaft being provided with coupling means, a winding head adapted to be secured to said die block, said winding head comprising a head block provided with means adapted to be releasably secured to said die block, said head block having a rotatable driven shaft journalled therein provided at its inner end with coupling means driven by said first named coupling means whereby rotation of said drive shaft rotates said driven shaft, said head block and said die block forming a shaped die recess, wire winding guiding means movable by said driven shaft, a needle driven by said driven shaft in a predetermined manner with respect to said wire winding guiding means for leading wire to said recess, and means on said head block for securing the free end of the wire to be wound into a coil, rotation of said driven shaft causing the needle and winding guiding means to lead and deposit the wire into the recess in a predetermined manner.

5. In a coil winding machine, the combination of a rotatable drive shaft, a forming die block, said drive shaft being journalled in said block, one end of said shaft being provided with coupling means, a winding head adapted to be secured to said die block, said winding head comprising a head block provided with means adapted to be releasably secured to said die block, said head block having a rotatable driven shaft journalled therein provided at its inner end with coupling means driven by said first named coupling means whereby rotation of said drive shaft rotates said driven shaft, said head block and said die block forming a shaped die recess, wire winding guiding means movable by said driven shaft and a needle driven by said driven shaft in a predetermined manner with respect to said wire winding guiding means for leading wire to said recess, rotation of said driven shaft causing the needle and winding guiding means to lead and deposit the wire into the recess in a predetermined manner.

6. In a coil winding machine, the combination of a rotatable drive shaft, a forming die block, said drive shaft being journalled in said block, one end of said shaft being provided with coupling means, a winding head adapted to be secured to said die block, said winding head comprising a head block provided with means adapted to be releasably secured to said die block, said head block having a rotatable driven shaft journalled therein provided at its inner end with coupling means driven by said first named coupling means whereby rotation of said drive shaft rotates said driven shaft, said head block and said die block forming a shaped die recess, wire winding guiding means rotatable by said driven shaft and a needle driven by said driven shaft in a predetermined manner with respect to said wire winding guiding means for leading wire to said recess, rotation of said driven shaft causing the needle and winding guiding means to lead and deposit the wire into the recess in a predetermined manner.

7. A winding head for a coil winding machine, said head comprising a head block provided with fastening means for releasably securing said head to the winding machine, said head block having a rotatable driven shaft journalled therein provided at its inner end with a tang adapted to engage the tang mating member of a drive shaft, said head block having spaced forming flanges, a forming block projecting from each flange at the outer surface thereof, said head block having spaced die surfaces, extending between said flanges, vertically disposed top and bottom jack shafts journalled in said head block and rotated by said driven shaft, said jack shafts being provided, respectively, with top and bottom wire winding guiding members fixed to said shafts and rotatable on said forming plates, said jack shafts rotating in opposite directions, said guiding members each having a guiding finger projecting beyond said forming plates, spaced sprockets pivoted to shafts secured to said head block, the axes of said shafts being in a vertical plane through the axis of said driven, drive and jack shafts, means between said driven shaft and one of said sprockets for rotating said last named sprocket, a chain passing over said sprockets to be moved upon rotation thereof, said chain having a needle for leading wire to said recesses, said needle having a cutting recess through which the wire runs in passing through said needle, and means on said head block for securing the free end of the wire to be wound into a coil.

8. A winding head for a coil winding machine, said head comprising a head block provided with fastening means for releasably securing said head to the winding machine, said head block having a rotatable driven shaft journalled therein and provided at one end thereof with coupling means whereby said driven shaft may be driven, said head block having die means thereon, winding guiding means located on opposite sides of the head block and die means and rotatable in opposite directions by said driven shaft, and a needle driven by said driven shaft in a predetermined manner with respect to said wire winding guiding means for leading wire to said die means.

9. Cutting and timing mechanism for a coil winding machine, comprising a timing shaft adapted to be rotated in a predetermined manner by the coil winding machine, a timing disk frictionally mounted on said timing shaft to be rotated thereby, said disk being provided with a notch, a notch control finger pivoted to said disk and resiliently urged to a position to at least partially obstruct said notch, said finger projecting beyond the periphery of said disk, a detent supported adjacent the periphery of said disk and resiliently urged toward said disk, a cutter member resiliently urged toward the wire, a projection on said detent for engaging said cutter member for holding said cutter member in inoperative position when said detent is in engagement with the periphery of said disk, said detent being adapted to enter said notch when rotated into position to move the control finger out of said notch thereby permitting said cutter member to move to a position to cut the wire being wound on the coil winding machine, the detent being movable to a position out of the notch permitting said control finger to move to hold said detent out of the notch thereby causing the cutter member to move to inoperative position, thus recycling the device for winding a coil.

KENLY C. BUGG.

References Cited in the file of this patent

UNITED STATES PATENTS

| Number | Name | Date |
|---|---|---|
| Re. 22,981 | Fitch | Mar. 9, 1948 |
| 497,476 | Morley | May 16, 1893 |
| 785,812 | Legg | Mar. 28, 1905 |
| 1,210,643 | Hayes | Jan. 2, 1917 |
| 1,702,475 | Jahnig | Feb. 19, 1929 |
| 1,807,199 | Dear | May 26, 1931 |
| 1,995,916 | Collins | Mar. 26, 1935 |
| 2,260,053 | Platt | Oct. 21, 1941 |
| 2,269,678 | Mauerer | Jan. 13, 1942 |
| 2,381,750 | Hunsdorf | Aug. 7, 1945 |
| 2,389,336 | Wirth | Nov. 20, 1945 |
| 2,389,783 | Kennedy | Nov. 27, 1945 |
| 2,395,736 | Grundmann | Feb. 26, 1946 |
| 2,441,541 | Hidzick | May 11, 1948 |
| 2,448,672 | Knauf | Sept. 7, 1948 |
| 2,453,749 | Hilsinger | Nov. 16, 1948 |
| 2,533,506 | Richard | Dec. 12, 1950 |